United States Patent
Iyer

(10) Patent No.: US 9,473,285 B2
(45) Date of Patent: *Oct. 18, 2016

(54) SIGNAL STRENGTH AWARE BAND STEERING

(71) Applicant: ARUBA NETWORKS, INC., Sunnyvale, CA (US)

(72) Inventor: Pradeep Iyer, Cupertino, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/228,713

(22) Filed: Mar. 28, 2014

(65) Prior Publication Data

US 2014/0211716 A1    Jul. 31, 2014

Related U.S. Application Data

(63) Continuation of application No. 13/098,184, filed on Apr. 29, 2011, now Pat. No. 8,687,512.

(51) Int. Cl.
*H04L 5/00* (2006.01)
*H04W 16/14* (2009.01)
*H04W 24/10* (2009.01)

(52) U.S. Cl.
CPC ............. *H04L 5/006* (2013.01); *H04W 16/14* (2013.01); *H04W 24/10* (2013.01)

(58) Field of Classification Search
CPC ...... H04L 47/14; H04L 5/006; H04W 28/08; H04W 16/14
See application file for complete search history.

(56) References Cited

U.S. PATENT DOCUMENTS

| 7,577,453 | B2 | 8/2009 | Matta |
| 2005/0197136 | A1 | 9/2005 | Friday et al. |
| 2005/0213579 | A1* | 9/2005 | Iyer ................... H04L 63/1441 370/395.2 |
| 2007/0082677 | A1 | 4/2007 | Donald et al. |
| 2008/0096501 | A1 | 4/2008 | Salomone et al. |
| 2009/0252097 | A1 | 10/2009 | Iyer et al. |
| 2009/0323531 | A1 | 12/2009 | Matta |

* cited by examiner

*Primary Examiner* — David Oveissi
(74) *Attorney, Agent, or Firm* — Hewlett Packard Enterprise Patent Department

(57) ABSTRACT

A system or method that receives a current request from a client, and responds to the current request based on signal strength associated with a previous request. If the current request is received on a non-preferred communication band, and a previous request was received on a preferred communication band within a pre-determined time, the system determines whether the signal strength associated with the previous request is weaker than a pre-determined threshold signal strength level for the preferred communication band. If so, the system responds to the current request. Otherwise, the system ignores the current request. If no recent request on the preferred communication band is received, and the signal strength associated with the current request is weaker than a pre-determined threshold signal strength level for the non-preferred communication band, the system responds to the current request on the non-preferred communication band. Otherwise, the system ignores the current request.

20 Claims, 7 Drawing Sheets

SIGNAL STRENGTH AWARE BAND STEERING

BENEFIT CLAIM; INCORPORATION BY REFERENCE

This application is a continuation of U.S. application Ser. No. 13/098,184 filed on Apr. 29, 2011, now U.S. Pat. No. 8,687,512, the content of which is hereby incorporated by reference. The application hereby rescinds any disclaimer of claim scope in the parent application or the prosecution history thereof and advices the USPTO that the claims in this application may be broader than any claim in the parent application.

BACKGROUND

The present disclosure relates to server band steering for wireless clients in a wireless network, and in particular, one embodiment of the disclosure relates to band steering based at least in part on wireless signal strengths.

In a conventional wireless network, such as a wireless network in accordance with Institute of Electrical and Electronics Engineers (IEEE) 802.11a/b/g standards, a single communication band is used for packet transmissions. With the development of wireless technology, e.g., IEEE 802.11n standard, wireless networking devices today support network communications on multiple communication bands, such as 2.4 GHz band and 5 GHz band. Likewise, wireless client technology today can provide client devices with capability to communicate via channels on multiple communication bands. Hence, guiding those client devices to communicate on a preferred communication band can improve the throughput and thus the performance of a wireless network.

Band steering is a wireless technique that is used to guide a client device capable of communicating in channels on multiple communication bands to establish an association with a wireless network on a preferred communication band. With conventional band steering techniques, after receiving requests transmitted from the client device on a preferred communication band, the client device is identified as capable of communicating on the preferred communication band. Thus, the wireless network service system will respond to requests received from the client device on the preferred communication band and ignore requests received from the client device on other non-preferred communication bands. Accordingly, client devices capable of communicating on multiple communication bands will be effectively directed to establish associations with the wireless network on the preferred communication band.

Nevertheless, although a communication band may be preferred in general, it is possible that, under various circumstances, a different communication band may become preferred for the same client device, which is capable of communicating on multiple communication bands. For example, when a client device is located far enough from an access point in a wireless network, the client device may receive stronger signals on 2.4 GHz communication band than on 5 GHz communication band. Moreover, static band steering based on band capacities of client devices does not take into account such factors as mobility of the client devices. Specifically, a client device capable of communicating on 5 GHz communication band could have excellent connectivity on 5 GHz communication band previously. However, the same client device might be moved later to a location where received signals on 5 GHz communication band become weaker than signals on the 2.4 GHz communication band. Thus, poor connectivity for the client device could result from following the conventional band steering technique to guide the client device to communicate on 5 GHz band after the client device's move.

DETAILED DESCRIPTION

Figure 1:
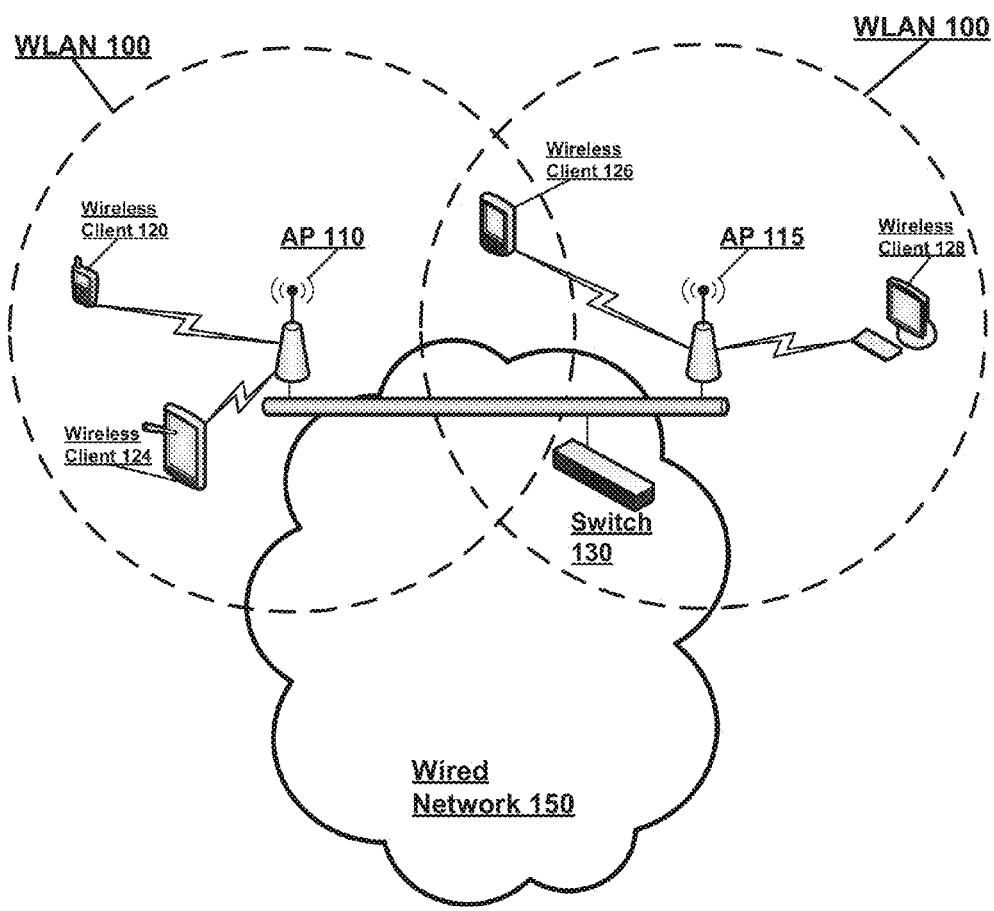
FIG. 1 is a diagram illustrating an example computing network environment according to embodiments of the present disclosure.

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the invention as claimed.

Overview

The present disclosure supports signal strength aware band steering for wireless clients in a wireless network. The disclosed band steering technique allows for making band steering decisions based on recently received signal strengths from wireless clients, thereby mitigating poor connectivity due to, for example, location or environmental changes experienced by those wireless clients subsequent to their previous associations with the wireless network. Guidance provided by the disclosed band steering technique may be based on utilization and/or coverage of different communication bands, capabilities and/or roaming characteristics of the client devices, types of communications, and so on.

Embodiments of the present disclosure may include a network device that receives a current request from a wireless client. The disclosed network device determines the strength of a signal associated with a previous request which is received at the network device within a pre-determined time period prior to the current request. In one embodiment, the disclosed network device determines a signal-to-noise ratio (hereinafter "SNR") associated with the signal instead of the strength of the signal. The SNR can be measured by, for example, received signal strength indicator (hereinafter "RSSI"). The disclosed network device also transmits a response corresponding to the current request to the wireless client based on the determined strength of the signal, or based on the determined SNR.

Specifically, in some embodiments, when the current request is a PROBE request received on a non-preferred communication band from a wireless client, the disclosed system determines whether a previous PROBE request was received on a preferred communication band from the same wireless client within a pre-determined time period. If so, the disclosed network device further determines whether the signal strength associated with the previous PROBE request is weaker than a pre-determined threshold signal strength level for the preferred communication band. If the signal strength associated with the previously received PROBE request is weaker than the pre-determined threshold signal strength level, the disclosed network device can infer that the wireless client recently experienced poor signal reception on the preferred communication band. Accordingly, the disclosed network device will respond to the current PROBE request from the wireless client, even though the current PROBE request is not received on a preferred communication band. On the other hand, if the disclosed network device determines that the signal strength associated with the previously received PROBE request is stronger than the threshold signal strength level, the network device ignores the current PROBE request received on the non-preferred communication band. Because the wireless client recently received strong signals on the preferred communication band, the disclosed network device will guide the wireless client to the preferred communication band by ignoring the current PROBE request and anticipating responding to a future PROBE request from the wireless client on the preferred communication band.

Moreover, in some embodiments, if no recent PROBE request on the preferred communication band is received from the wireless client, the disclosed network device further determines whether the signal strength associated with the current PROBE request received on the non-preferred communication band is weaker than a pre-determined threshold signal strength level for the non-preferred communication band. If so, the disclosed network device will assume that the wireless client's signal reception on the preferred communication band is likely to be even weaker than its signal reception on the non-preferred communication band, and thus will respond to the current PROBE request on the non-preferred communication band. Otherwise, the disclosed network device will guide the wireless client to the preferred communication band by ignoring the current PROBE request and anticipating responding to a future PROBE request from the wireless client on the preferred communication band.

Note that the assumption that the wireless client's signal reception on the preferred communication band is likely to be weaker than its signal reception on the non-preferred communication band is based on present industrial practices in wireless technology. Specifically, a low frequency communication band such as 2.4 GHz communication band is currently regarded as an example of non-preferred communication band; a high frequency communication band such as 5 GHz band is currently regarded as an example of preferred communication band. This is so because the 5 GHz communication band, compared to the 2.4 GHz communication band, has more available channels for wireless network communications in compliance with government regulations, broader bandwidth in each channel, as well as less radio-frequency (hereinafter "RF") interference from other systems such as cordless phones, microwaves, and other existing wireless networks. However, it is possible for a low frequency band rather than a high frequency band to become the preferred communication band. In such situations, the disclosed network device can adjust the assumption and the determination accordingly.

Computing Environment

FIG. 1 is a block diagram illustrating an example computing network environment according to one embodiment of the present disclosure. FIG. 1 includes wireless local area network (WLAN) 100, access points 110 and 115, wireless clients 120, 124, 126, and 128, switch 130, and wired network 150.

In the example illustrated in FIG. 1, WLAN 100 couples one or more access points (e.g., access point 110 and access point 115) to a plurality of wireless clients, such as wireless clients 120, 124, 126, and 128. Although two access points 110 and 115 are depicted in FIG. 1A, it should be noted that the disclosed system can include only one access point or more than two access points that are either centrally located or distributed in WLAN 100. For illustration purposes, access point 110 is coupled with wireless clients 120 and 124, and access point 115 is coupled with wireless clients 126 and 128 over WLAN 100 through any commonly supported wireless communication technology.

Access points 110 and 115 are hardware units that act as communication nodes by linking wireless mobile stations, such as personal computers, to a wired backbone network. Access point 110 or 115 may generally broadcast a service set identifier (SSID). Access point 110 or 115 may connect client devices or users to other client devices or users in the network. Also, access point 110 or 115 may serve as a point of connection between WLAN 100 and wired network 150.

Access point 110 or 115 may have one or more radios. The radios may be configured to support various wireless communication standards. In particular, the radios may include multiple antennas to support multiple-input and multiple-output (MIMO) technology as used in Institute of Electrical and Electronics Engineers (IEEE) 802.11n wireless networking standards (WiFi), Worldwide Interoperability for Microwave Access standards (WiMAX), 4th Generation cellular wireless standards (4G), 3rd Generation Partnership Project Long Term Evolution (3GPP LTE), and Evolved High-Speed Packet Access (HSPA+). In one embodiment, access point 110 or 115 performs media access control (MAC) processing functions, such as, terminating the wireless transmission data and management protocols, translating data between the wired and wireless portions of the network, maintaining statistical information regarding wireless clients and the radio environment, and so on.

Wireless clients 120-128 may be any computing device that includes a network communication interface, which is capable of wireless communications. For example, wireless clients 120-128 can be, but are not limited to, smart mobile phone 120, laptop or tablet computing device 124, personal desktop or work station 128, etc.

In the example illustrated in FIG. 1, WLAN 100 and wired network 150 are coupled via switch 130. Switch 130 can be any type of networking device that processes and routes data at the data link layer (i.e., layer 2) of Open Systems Interconnection model ("OSI model"). In some embodiments, switch 130 may additionally processes data at the network layer (i.e., layer 3) and above in the OSI model. In one embodiment, switch 130 swaps topology data and client information, such as user identifier, location, authentication state, permissions, roaming history, bandwidth consumption, etc. In one embodiment, switch 130 provides forwarding, queuing, tunneling, and/or other security services. In one embodiment, switch 130 may further function to coordinate and manage configurations of coupled access points. Moreover, in some embodiments, switch 130 and access point 110 or 115 may be integrated in a single network device. Note that WLAN 100 and wired network 150 can be coupled by such devices as a switch, a router, or any other networking devices capable of interfacing with both a wireless network and a wired network.

Wired network 150 generally include any type of network which involves transmission of data over a wire-based communication technology, for example, Ethernet, fiber-optic communication networks, cable networks, telephone networks, electromagnetic networks, etc.

Communication Band Channels

Figure 2:
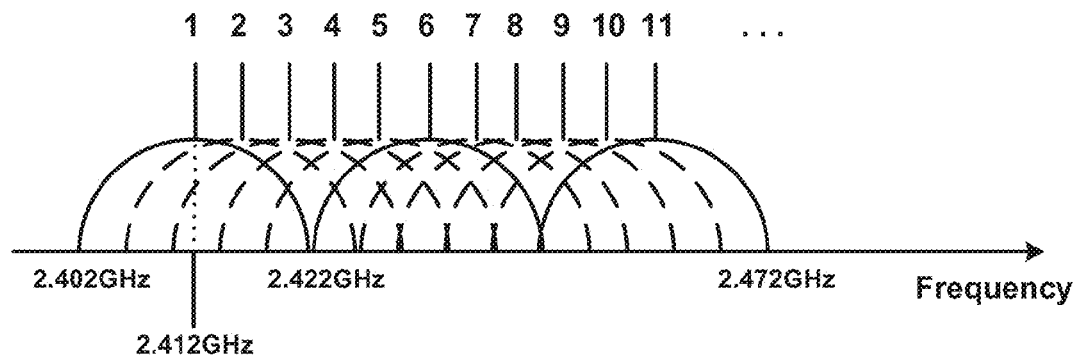
FIG. 2 is a diagram illustrating an example of communication channels at different band frequencies according to embodiments of the present disclosure.
Figure 2:
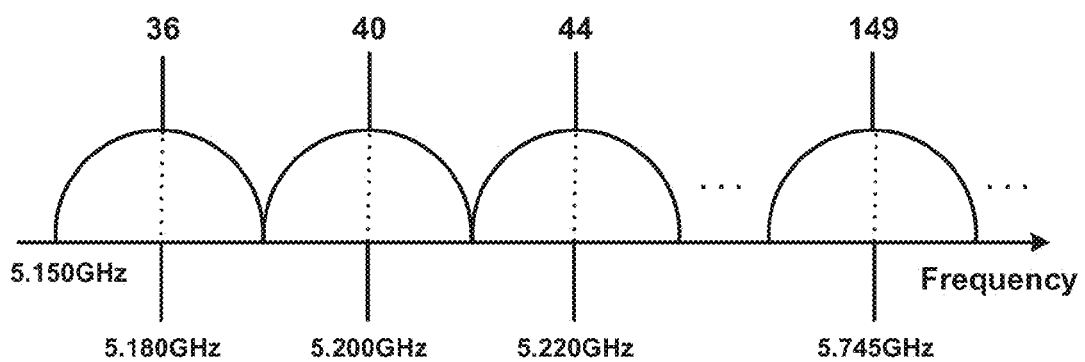

FIG. 2 is a diagram illustrating an example of communication channels at different band frequencies. WLAN devices, such as access points, use one or more radios and their antennas to send and receive the radio waves, and make small changes to the waves to encode data. WLAN radio waves have a repeating signal that, when graphed over time, shows a repeating periodic waveform characterized by a frequency (the number of times the waveform repeats per second), an amplitude (the height of the waveform), and a phase (the particular point in the repeating waveform). Of these characters, frequency, which is measured in hertz (Hz), plays an important role for WLANs.

Because many electronic devices radiate energy at varying frequencies, to prevent the energy radiated by one device from interfering with other devices, government agencies (e.g., Federal Communications Commission of the United States, hereinafter "FCC") often enact regulations on the usage of radio frequencies. A frequency band typically refers to a range of consecutive frequencies. The wider the range of frequencies in a frequency band, the greater the amount of data that can be sent in that frequency band. The FCC licenses some frequency bands, and leaves other frequency bands unlicensed.

When an access point sends data, it can modulate the radio signal's frequency, amplitude, and phase to encode a binary. There are three general classes of encoding: Frequency Hopping Spread Spectrum (FHSS), Direct Sequence Spread Spectrum (DSSS), and Orthogonal Frequency Division Multiplexing (OFDM).

FHSS uses all frequencies in a band, and hops from one frequency to another frequency. By using slightly different frequencies for consecutive transmissions, a device using FHSS for encoding is likely to avoid interference from other devices that use the same unlicensed band, and to succeed at sending data at some frequencies in the band.

DSSS uses one of several separate channels or frequencies. The band used by DSSS has a bandwidth of 82 MHz, with a range from 2.402 GHz to 2.483 GHz. As regulated by the FCC, this band can have 11 different overlapping DSSS channels. An example is shown as 2.4 GHz band channels 200 in FIG. 2.

Likewise, OFDM can use multiple non-overlapping channels. Frequency division multiplexing (FDM) is a technology that transmits multiple signals simultaneously over a single transmission path, such as a cable or wireless system. Each signal travels within its own unique frequency range, which is modulated by the data (such as text, voice, video, etc.). Orthogonal FDM's (OFDM) spread spectrum technique distributes the data over a large number of carriers that are spaced apart at precise frequencies. This spacing provides the orthogonality, which prevents the demodulators from seeing frequencies other than their own. OFDM provides high spectral efficiency, resiliency to RF interference, and lower multi-path distortion.

In the illustrated example 200 in FIG. 2, the 2.4 GHz frequency band includes multiple communication channels. The first communication channel corresponds to a frequency spectrum from 2.402 GHz to 2.422 GHz with a mid-point frequency of 2.412 GHz. The second communication channel overlaps with the first communication channel, and corresponds to a mid-point frequency of 2.417 GHz. Likewise the third communication channel overlaps with both the first and the second communication channels with an even higher mid-point frequency. Mid-point frequencies of the eleven commonly used 2.4 GHz band channels in the United States are summarized in Table 1 below.

TABLE 1

2.4 GHz band channels unlicensed in the US

| Channel | 1 | 2 | 3 | 4 | 5 | 6 |
|---|---|---|---|---|---|---|
| Frequency(GHz) | 2.412 | 2.417 | 2.422 | 2.427 | 2.432 | 2.437 |
| Channel | 7 | 8 | 9 | 10 | 11 | |
| Frequency(GHz) | 2.442 | 2.447 | 2.452 | 2.457 | 2.462 | |

Therefore, as illustrated in FIG. 2 and Table 1, there are only three non-overlapping channels in the 2.4 GHz communication band. The three non-overlapping channels are channels 1, 6, and 11. Thus, in a WLAN that operates on the 2.4 GHz communication band, access points are typically configured to transmit data within one of the three non-overlapping channels to reduce interference and to improve transmission quality.

FIG. 2 further illustrates example 5 GHz band channels 250 in accordance with one embodiment. Mid-point frequencies of the twenty-four commonly used channels in the United States are summarized in Table 2 below.

TABLE 2

5 GHz band channels unlicensed in the US

| Channel | Frequency (GHz) |
|---|---|
| 36 | 5.180 |
| 40 | 5.200 |
| 44 | 5.220 |
| 48 | 5.240 |
| 52 | 5.260 |
| 56 | 5.280 |
| 60 | 5.300 |
| 64 | 5.320 |
| 100 | 5.500 |
| 104 | 5.520 |
| 108 | 5.540 |
| 112 | 5.560 |
| 116 | 5.580 |
| 136 | 5.680 |
| 140 | 5.700 |
| 149 | 5.745 |
| 153 | 5.765 |
| 157 | 5.785 |
| 161 | 5.805 |
| 165 | 5.825 |

Therefore, 5 GHz communication bands have more non-overlapping communication channels compared to 2.4 GHz communication bands, which implies less radio congestion and RF interference in the 5 GHz communication bands than in the 2.4 GHz communication band. Moreover, operating at the 5 GHz communication bands is advantageous over operating at the 2.4 GHz communication bands also because the 5 GHz communication bands offer better penetration, better scatter, little abnormal adsorption by water or damp, and possibility of OFDM over the entire speed range, and so on.

Signal Strength and Interference

Figure 3:
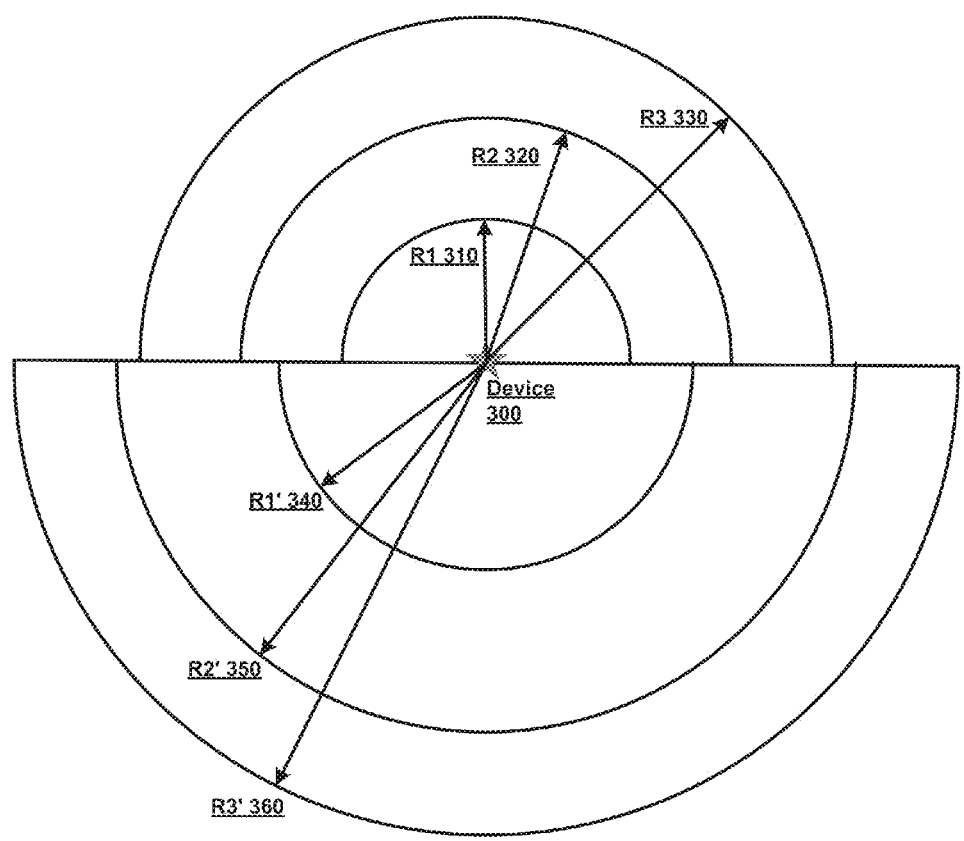
FIG. 3 is a diagram illustrating signal strengths as varied by locations in different communication bands according to embodiments of the present disclosure.

FIG. 3 is a diagram illustrating signal strengths as varied by locations in different communication bands. Device 300 can be any network device capable of transmitting and receiving wireless signals, such as an access point. The volume around wireless device 300 at which wireless clients can send and receive wireless data for any of the supported bit rates is known as coverage volume. For simplicity of illustration, wireless coverage area is herein used to refer to a wireless signal's propagation in the horizontal plane among the three dimensions that the wireless signal can propagate. The shape of the coverage volume and/or coverage area depends on the type of antenna used by wireless device 300 and on the presence of signal propagation modifiers and/or other interference sources. With an idealized omnidirectional antenna, the coverage volume is a series of concentric spherical shells of signal strengths corresponding to a series of different supported bit rates. Generally, the wireless data transmission bit rates decreases as the distance from device 300 increases. Moreover, typically, the higher band frequency at which wireless data is transferred at, the smaller coverage area that the wireless transmission signals from device 300 can reach. Thus, the same data bit rate usually covers a smaller coverage area when transmitted in a 5 GHz communication band than in a 2.4 GHz communication band. Likewise, a location at a specific distance from wireless device 300 will likely receive stronger 2.4 GHz signals than 5 GHz signals.

Despite of the difference in the signal strengths between 2.4 GHz signals and 5 GHz signals, 5 GHz communication band often is regarded as the preferred wireless communication band due to less interference. There are several sources of interfering signals in the 2.4 GHz communication band, including microwave ovens, cordless telephones, Bluetooth-enabled devices, other neighboring wireless LANs, and so on.

Signal-to-noise ratio ("SNR") is generally defined as the power ratio between a signal (meaningful information) and the background noise (unwanted signal):

$$SNR = \frac{P_{signal}}{P_{noise}},$$

where P is average power. Both signal and noise power are measured at the same point or equivalent points in a system, and within the same system bandwidth. If the signal and the noise are measured across the same impedance, then the SNR can be obtained by calculating the square of the amplitude ratio:

$$SNR = \frac{P_{signal}}{P_{noise}} = \left(\frac{A_{signal}}{A_{noise}}\right)^2,$$

where A is root mean square ("RMS") amplitude. Because many signals have a very wide dynamic range, SNRs are often expressed using the logarithmic decibel scale. In decibels, the SNR can be defined as:

$$SNR_{dB} = 10\log_{10}\left(\frac{P_{signal}}{P_{noise}}\right) = P_{signal,dB} - P_{noise,dB},$$

which may equivalently be written using amplitude ratios as:

$$SNR_{dB} = 10\log_{10}\left(\frac{A_{signal}}{A_{noise}}\right)^2 = 20\log_{10}\left(\frac{A_{signal}}{A_{noise}}\right).$$

The concepts of signal-to-noise ratio and dynamic range are closely related. On the one hand, dynamic range measures the ratio between the strongest un-distorted signal on a channel and the minimum discernable signal, which for most purposes is the noise level. On the other hand, SNR measures the ratio between an arbitrary signal level (not necessarily the most powerful signal possible) and noise. Measuring signal-to-noise ratios requires the selection of a representative or reference signal. Although in WLAN, SNR is often used to indicate the level of interferences and the strength of signals, it shall be noted that other measures can be used instead of SNR without departing from the spirit of the instant disclosure.

The SNR of an access point signal, measured at the user device, decreases as range to the user increases, because the applicable free space loss between the user and the access point reduces signal level. Likewise, the SNR of the signals propagating from the user device to an access point also decreases as range to the access point increases. Moreover, an increase in RF interference from microwave ovens and cordless phones, which increases the noise level, also decreases SNR. Therefore, SNR directly impacts the performance of a WLAN connection. A higher SNR value typically means that the signal strength is stronger in relation to the noise levels, which allows for higher data rates and fewer retransmissions, and hence better throughput. On the other hand, a lower SNR requires WLAN devices to operate at lower data rates, which results in decreased throughput. For example, a SNR of 30 dB may allow a wireless client and access point to communicate at 24 Mbps, whereas a SNR of 15 dB may only provide for 6 Mbps communication speed.

Table 3 below shows example ranges of signal strengths as indicated by SNR. These ranges can be determined by empirical testing, and may vary between different band frequencies, or based on different types of communications. For example, 5 GHz communication band may require higher SNR than 2.4 GHz communication band for the same data transmission throughput. Also, video transmission over WLAN may require higher SNR than voice-over-IP transmissions, which may require higher SNR than data or text transmissions over WLAN.

TABLE 3

Sample SNR range and signal strengths comparison

| SNR | Signal Strength |
|---|---|
| >40 dB | Excellent signal |
| 25 dB~40 dB | Very good signal |
| 15 dB~25 dB | Low signal |
| 10 dB~15 dB | Very low signal |
| 5 dB~10 dB | No signal |

In the example embodiment illustrated in FIG. 3, R1 310 represents the radius corresponding to a wireless coverage area with good and/or excellent wireless signals in the 5 GHz communication band; R2 320 represents the radius corresponding to a wireless coverage area with low signals in the 5 GHz communication band; R3 330 represents the radius corresponding to a wireless coverage area with very low to no signals in the 5 GHz communication band. Similarly, R1' 340 represents the radius corresponding to a wireless coverage area with good and/or excellent wireless signals in the 2.4 GHz communication band; R2' 350 represents the radius corresponding to a wireless coverage area with low signals in the 2.4 GHz communication band; R3' 360 represents the radius corresponding to a wireless coverage area with very low to no signals in the 2.4 GHz communication band.

As described above, with an idealized omnidirectional antenna, the wireless coverage area in the horizontal plane resembles a circle area. The semi-circles in FIG. 3 are drawn for the ease of comparison between the 2.4 GHz communication band and the 5 GHz communication band. Also, it should be noted that the wireless coverage areas can be determined on a case-by-case basis. In general, R1 310 is smaller than R1' 340; R2 320 is smaller than R2' 350; and R3 330 is smaller than R3' 360. However, wireless coverage areas depicted in FIG. 3 shall not be construed as limiting the relationships among radius factors as illustrated. Also, note that the SNR range for signals might differ at the 2.4 GHz communication band and at the 5 GHz communication band. For example, whereas 15 dB to 25 dB SNR may be considered as low signals at the 2.4 GHz communication band, low signals at the 5 GHz communication band might correspond to 20 dB to 30 dB SNR.

In some embodiments, SNR can be measured by received signal strength indicator ("RSSI"), which is an indication of the power level being received by the antenna as sampled during the preamble stage of receiving a wireless data frame. In other embodiments, received channel power indicator ("RCPI") is used to indicate the signal strength. RCPI is a functional measurement covering the entire received frame with defined absolute levels of accuracy and resolution.

Band Steering Based on Signal Strength

FIGS. 4A-4D are sequence diagrams illustrating signal strength aware band steering. Communication exchanges in WLAN as illustrated in FIGS. 4A-4D typically involve two parties: client 410 and access point ("AP") 420. Note that access point 420 can be substituted by a controller, a switch, or any other network device, which is coupled to client 410 through network, and which is capable of establishing an association with client 410 via receiving and responding to PROBE requests from client 410. Also, it is contemplated that the disclosure describes an analysis based on receipt of a PROBE request, although it is contemplated that this analysis may be conducted for any wireless signaling that requests return signaling.

Figure 4A:
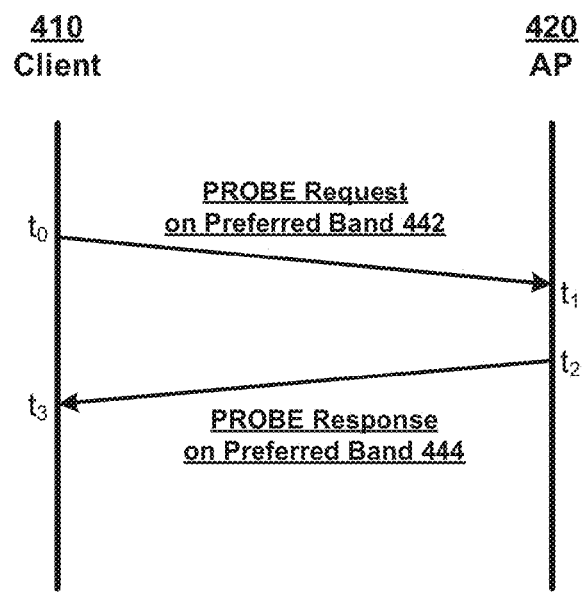
FIGS. 4A-4D are sequence diagrams illustrating signal strength aware band steering according to embodiments of the present disclosure.

Specifically, FIG. 4A illustrates a sequence diagram in which access point 420 receives a wireless signal, such as a PROBE request for example, on a preferred communication band 442 from client 410. During operations, client 410 initiates a PROBE request 442 at time $t_0$. PROBE request 442 is received by AP 420 at time $t_1$. After receiving PROBE request 442 at time $t_1$, AP 420 determines whether PROBE request 442 is received in a channel on a preferred communication band. Because PROBE request 442 is received on the preferred communication band, AP 420 transmits a responsive signal, such as a PROBE response 444 for example, on the preferred communication band at time $t_2$. PROBE response 444 on the preferred communication band is received by client 410 at time $t_3$, subsequent to which WLAN coupled to AP 420 will become visible to client 410 for association.

Figure 4B:
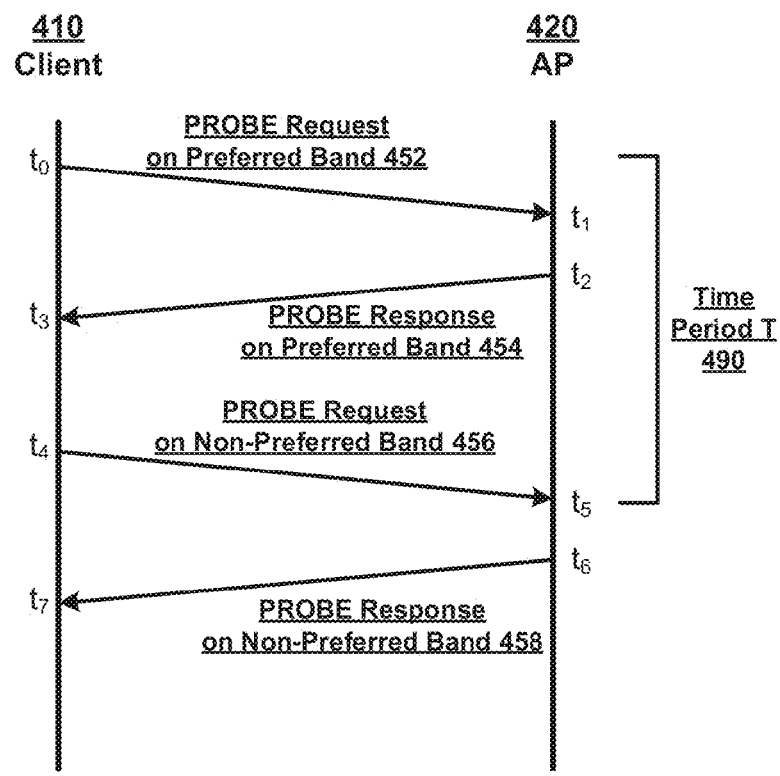

FIG. 4B illustrates a sequence diagram in which access point ("AP") 420 receives a PROBE request 456 on a non-preferred communication band from client 410 at $t_5$, where a recent PROBE request 452 on a preferred communication band is received by the same access point 420 at time $t_1$. During operations, at time $t_0$, client 410 transmits a PROBE request 452 on a preferred communication band to AP 420, which is received by AP at time $t_1$. In response, at time $t_2$, AP 420 transmits PROBE response 454 on the preferred communication band to client 410, and PROBE response 454 is received by client 410 at time $t_3$. Later, the same client 410 transmits another PROBE request 456 on a non-preferred band at time $t_4$. PROBE request 456 is received by AP 420 at time $t_5$.

After receiving PROBE request 456 at time $t_5$, AP 420 determines whether PROBE request 456 is received in a channel on a preferred communication band. In the illustrated example, PROBE request 456 is received on a non-preferred communication band. Thus, AP 420 also determines whether, within a pre-determined time period T 490, AP 420 has received a PROBE request on a preferred communication band. In the illustrated example, because PROBE request 452 on the preferred communication band is received within time period T 490, AP 420 further determines whether the strength of the signal associated with PROBE request 452 is weaker than a threshold signal strength level corresponding to the preferred communication band. If so, AP 420 will infer that client 410 recently has had poor connectivity on the preferred communication band, and thus will respond to the current PROBE request 456 on the non-preferred communication band. Accordingly, AP 420 will transmit PROBE response 458 at time $t_6$, which is received by client 410 at time $t_7$.

In order to track recent signal strengths, AP 420 can be configured to store, for at least a pre-determined period of time, a signal strength indicator value when a PROBE request is received on a preferred communication band. When the stored signal strength expires after the pre-determined period of time, the disclosed system will infer that there has been no recent PROBE request received on the preferred communication band. On the other hand, when a second PROBE request is received before the stored signal strength associated with a first PROBE request expires (that is, the second PROBE request arrives within the pre-determined period of time after the first PROBE request is received), the disclosed system will replace the stored signal strength with a value corresponding to the signal strength associated with the second PROBE request. Note that the example provided herein is by way of illustration only. Other implementations of tracking and storing information may be used to accomplish the objective.

Moreover, the period of time is determined prior to receiving the PROBE request, but can be either statically or dynamically determined based on factors, such as network interference level and/or stability, clients' roaming profile and/or mobility, etc. In one embodiment, the disclosed system can adjust to a shorter period of time when more mobile client devices are observed in the WLAN. In another embodiment, the disclosed system can adjust to a shorter period of time when the WLAN is regarded as more unstable due to higher noise levels. Therefore, tracking a mobile client's recent PROBE request's signal strength allows WLAN to dynamically adjust to service the needs of moving client devices and varying wireless environments.

The strength of the signal may be indicated by signal-to-noise ratio ("SNR"). In one embodiment, the signal strength is measured by received signal strength indicator ("RSSI"). In another embodiment, the signal strength is measured by received channel power indicator ("RCPI").

Also, note that the threshold signal strength level, which the signal strength of the recent PROBE request is compared to, corresponds to the preferred communication band. The non-preferred communication band may correspond to the same or a different threshold signal strength level. Different thresholds for preferred communication band and non-preferred communication band facilitates solving potential throttling issues where a client device with signal strength level close to the threshold is steered back and forth between the preferred communication band and the non-preferred communication band. Moreover, the threshold signal strength level may depend on the type of communications. For example, video-on-demand wireless transmissions may require higher threshold signal strength level than voice-over-IP wireless transmissions on the same communication band. Similarly, voice-over-IP wireless transmissions may require higher threshold signal strength level than wireless transmissions of data or textual information on the same communication band. Further, the threshold signal strength level can be configurable by a network administrator, or can be dynamically adjusted based on network and/or wireless client profiles.

Figure 4C:
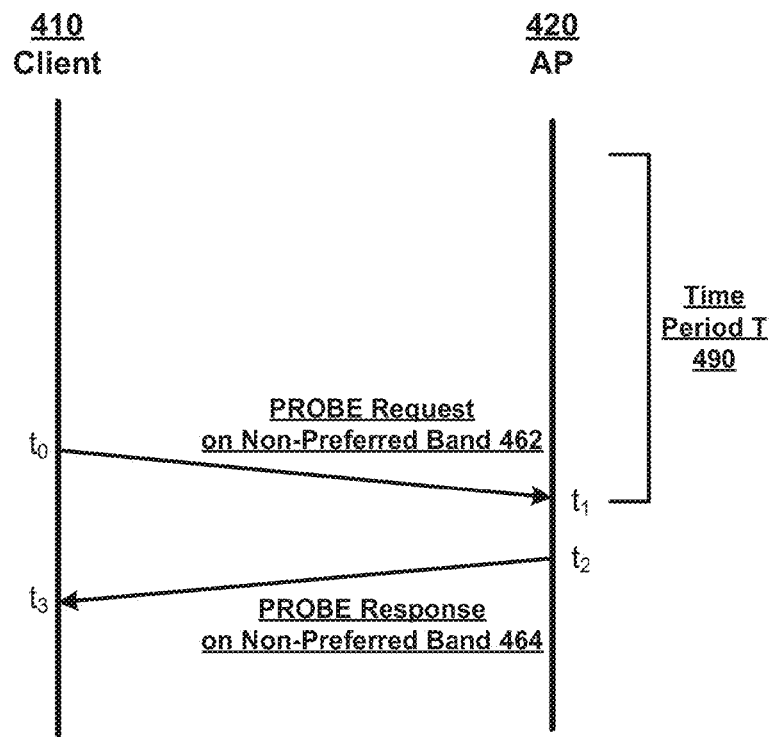

FIG. 4C illustrates a sequence diagram in which access point ("AP") 420 receives PROBE request 462 on a non-preferred communication band from client 410 at $t_1$, where no recent PROBE request on a preferred communication band is received by the same AP. During operations, at time $t_0$, client 410 transmits a PROBE request 462 on a non-preferred communication band to AP 420, which is received by AP at time $t_1$. After receiving PROBE request 462 at time $t_1$, AP 420 determines whether PROBE request 462 is received in a channel on a preferred communication band. In the example illustrated in FIG. 4C, PROBE request 462 is received on a non-preferred communication band. Thus, AP 420 also determines whether, within a pre-determined time period T 490, AP 420 has received a PROBE request on a preferred communication band. In the illustrated example, because no PROBE request is received on the preferred communication band within time period T 490, AP 420 further determines whether the strength of the signal associated with PROBE request 462 is weaker than a threshold signal strength level corresponding to the non-preferred communication band. If so, AP 420 will infer that client 410 currently has poor connectivity on the non-preferred communication band, and thus will further infer that client 410 would have poorer connectivity on the preferred communication band. Accordingly, AP 420 will respond to the current PROBE request 462 on the non-preferred communication band. Specifically, AP 420 will transmit, at time $t_2$, PROBE response 464, which is received by client 410 at time $t_3$.

Note that the above inferences are drawn because, with the present practice in wireless technologies, a high frequency communication band (e.g., 5 GHz band) is commonly regarded as an example of preferred communication bands; and a low frequency communication band (e.g., 2.4 GHz band) is commonly regarded as an example of non-preferred communication bands. Because high frequency wireless signals usually can be transmitted within a shorter distance than low frequency wireless signals, if a wireless client receives signals with low signal strength at 2.4 GHz at a specific time and a specific location in the WLAN, the wireless client is likely to receive signals with even lower strength at 5 GHz than at 2.4 GHz at the same time and location in the WLAN. However, other inferences, which can be the same as or different from the above example, may be drawn based on other knowledge, such as network profile, device profile, etc. Such knowledge can include, but is not limited to, scheduled maintenance time of co-existing WLAN, elevation of a client device, recent malfunction of client device, locations of radio waves barrier surfaces, etc.

Figure 4D:
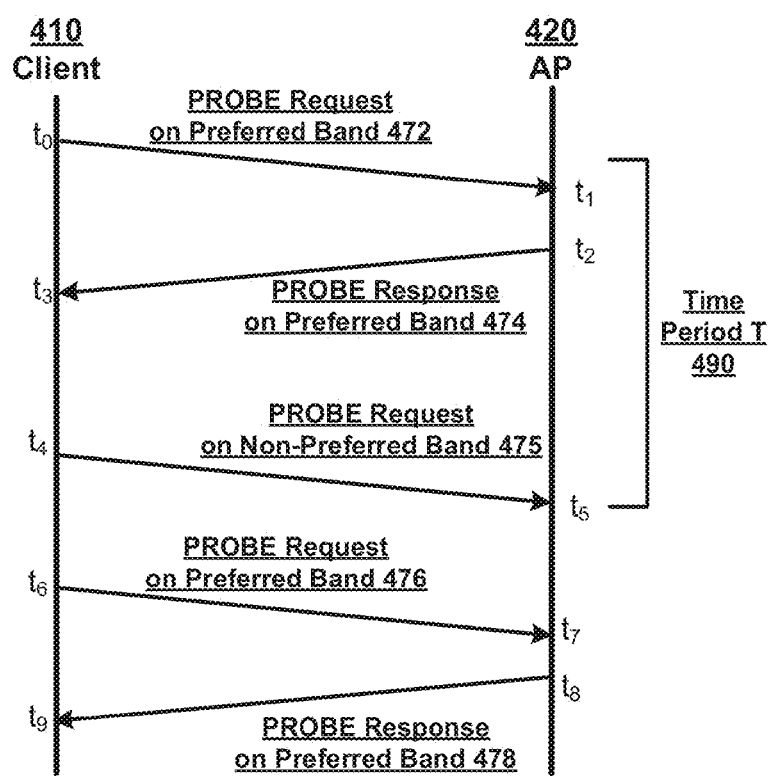

FIG. 4D illustrates a sequence diagram in which access point ("AP") 420 receives a PROBE request 475 on a non-preferred communication band from client 410 at time $t_5$, where a recent PROBE request 472 on a preferred communication band is received with strong signal strength by the same access point 420 at time $t_1$. During operations, at time $t_0$, client 410 transmits a PROBE request 472 on a preferred communication band to AP 420, which is received by AP at time $t_1$. In response, as disclosed above in the description of FIG. 4B, at time $t_2$, AP 420 transmits PROBE response 474 on the preferred communication band to client 410, and PROBE response 474 is received by client 410 at time $t_3$. Later, the same client 410 transmits another PROBE request 475 on a non-preferred communication band at time $t_4$. PROBE request 475 is received by AP 420 at time $t_5$.

After receiving PROBE request 475 at time $t_5$, AP 420 determines whether PROBE request 475 is received in a channel on a preferred communication band. In the illustrated example, PROBE request 475 is received on a non-preferred communication band. Thus, AP 420 further determines whether, within a pre-determined time period T 490, AP 420 has received a PROBE request on a preferred communication band. In the example illustrated in FIG. 4D, because PROBE request 472 on the preferred communication band is received within time period T 490, AP 420 infers that client 410 is capable of transmitting and receiving wireless signals in multiple communication bands, which include both preferred and non-preferred communication bands. In order to guide client 410 to associate on a preferred communication band to achieve high network performance, AP 420 further determines whether the strength of the signal associated with PROBE request 472 is weaker than a threshold signal strength level corresponding to the preferred communication band. Because the signal strength associated with PROBE request 472 is not weaker than the threshold signal strength level corresponding to the preferred communication band, AP 420 will infer that client 410 recently has had good or excellent connectivity on the preferred communication band, and thus will ignore the current PROBE request 475 on the non-preferred communication band and will anticipate client 410 to initiate a future PROBE request on the preferred communication band. In this example, because client 410 does not receive a response to PROBE request 475 on the non-preferred communication band, client 410 transmits a new PROBE request 476 on the preferred communication band at time $t_6$. AP 420 receives the new PROBE request 476 on the preferred communication band at time $t_7$, and transmits corresponding PROBE response 478 on the preferred communication band to client 410 at time $t_8$. Client 410 receives PROBE response 478 on the preferred communication band at time $t_9$.

In some embodiments, when no recent PROBE request is received on the preferred communication band within a pre-determined period of time, and the current PROBE request received on a non-preferred communication band has a signal strength stronger than the threshold signal strength for the non-preferred communication band, the disclosed system will not be able to determine whether the client sending the current PROBE request is capable of wireless transmissions on multiple communication bands. Therefore, the disclosed system may assume that the client is capable of associating with the preferred communication band, and ignore PROBE requests on the non-preferred communication bands for a pre-determined number of times.

If the system receives a PROBE request on a preferred communication band, the system will respond to the PROBE request on the preferred communication band. If the system does not receive any PROBE requests on the preferred communication band, the system will respond to the PROBE request received on the non-preferred communication band after a specified number of retransmissions of PROBE requests from the client, or after a specified period of time.

Signal Strength Aware Band Steering Process

Figure 5:
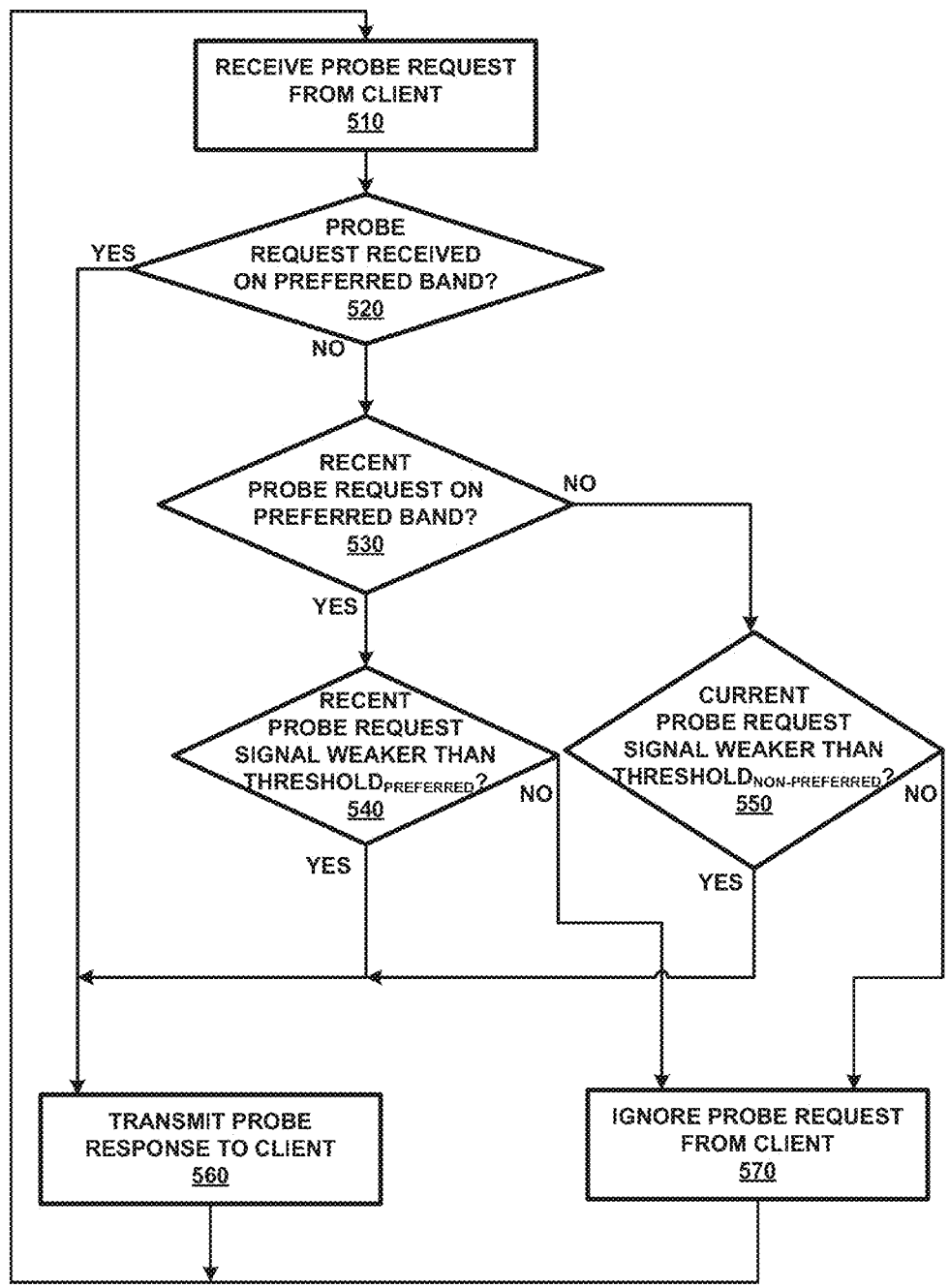
FIG. 5 is a flowchart illustrating the process of signal strength aware band steering according to embodiments of the present disclosure.

FIG. 5 is a flowchart illustrating the process of signal strength aware band steering. During operations, the disclosed system receives a wireless signal (e.g., a PROBE request) from a client in a WLAN (operation 510). The system then determines whether the PROBE request is received on a preferred communication band (operation 520). If so, the system transmits a corresponding wireless return signal (e.g., a PROBE response) on the preferred communication band to the client (operation 560).

In one embodiment, if the PROBE request is determined to be received on a non-preferred communication band, the system next determines whether there are any recent PROBE requests received on the preferred time within a pre-determined period of time (operation 530).

In one embodiment, if at least one recent PROBE request is received on the preferred band within the pre-determined period of time, the system will determine whether the signal strength associated with the recent PROBE request is weaker than a threshold signal strength corresponding to the preferred communication band (operation 540). If so, the system will infer that the client recently has had poor connectivity on the preferred communication band, and thus will respond to the current PROBE request on the non-preferred communication band (operation 560).

Otherwise, because recent PROBE request has been received on the preferred band, according to one embodiment, the system infers that the client is capable of transmitting and receiving wireless signals in multiple communication bands, which include both preferred and non-preferred communication bands. Also, because the signal strength associated with the recent PROBE request on the preferred communication band is stronger than the threshold signal strength level corresponding to the preferred communication band, according to one embodiment, the system will infer that the client recently has had good or excellent connectivity on the preferred communication band, and thus will ignore the current PROBE request received on a non-preferred communication band (operation 570). The system does so in anticipation that the same client will initiate a future PROBE request on the preferred communication band.

In one embodiment, if no recent PROBE request is received on the preferred communication band from the client, the system will further determine whether the signal strength associated with the current PROBE request, which is received on a non-preferred communication band, is weaker than a threshold signal strength level corresponding to the non-preferred communication band (operation 550). If so, according to one embodiment, the system will infer that the client currently has poor connectivity on the non-preferred communication band, and thus will further infer that the client would have poorer connectivity on the preferred communication band. Thus, the system will respond to the current PROBE request on the non-preferred communication band (operation 560).

On the other hand, if, in some embodiments, the system determines that no recent PROBE request is received on the preferred communication band from the client (operation 530), and the signal strength associated with the current PROBE request received on a non-preferred communication band is stronger than a threshold signal strength level corresponding to the non-preferred communication band (operation 550), the system will ignore the current PROBE request from the client (operation 570).

Since the disclosed system is not able to determine whether the client sending the current PROBE request on non-preferred communication band is capable of wireless transmissions on multiple communication bands. Therefore, the disclosed system may assume that the client is capable of associating with the WLAN on the preferred communication band, and ignore PROBE requests received from the client on the non-preferred communication bands for a number of retransmissions or a period of time.

Signal Strength Aware Band Steering System

Figure 6:
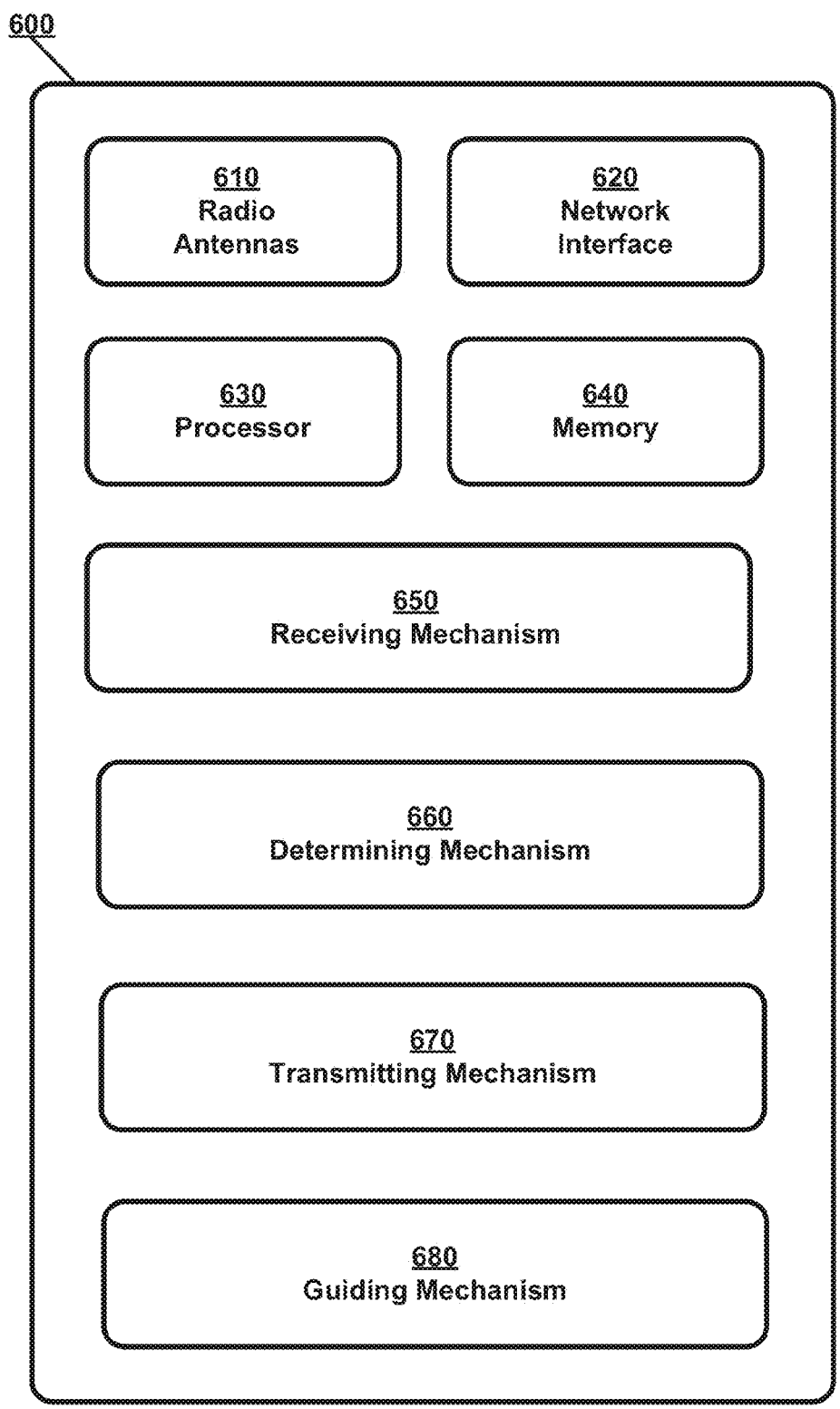
FIG. 6 is a block diagram illustrating a system for signal strength aware band steering according to embodiments of the present disclosure.

FIG. 6 is a block diagram illustrating a network device for signal strength aware band steering. Network device 600 includes at least one or more radio antennas 610 capable of either transmitting or receiving radio signals or both, a processor 630 capable of processing computing instructions, a network interface 620 capable of communicating to a wired or wireless network, and a memory 640 capable of storing instructions and data. Moreover, network device 600 further includes a receiving mechanism 650, a determining mechanism 660, a transmitting mechanism 670, and a guiding mechanism 680, all of which are coupled to the processor and the memory in network device 600. Network device 600 may be used as a client system, or a server system, or may serve both as a client and a server in a distributed or a cloud networking system.

Radio 610 may be any combination of known or convenient electrical components, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 receives one or more wireless signals including requests, such as PROBE requests, as describe in the present disclosure.

Determining mechanism 660 determines strength of a signal associated with a request received at network device 600. In one embodiment, determining mechanism 660 also determines whether strength of a signal is weaker than a threshold signal strength level corresponding to a preferred (or non-preferred) communication band. In some embodiments, the determined signal strength is indicated by a signal-to-noise ratio associated with the signal. In some embodiments, the determined signal strength can be measured by received signal strength indicator ("RSSI") or received channel power indicator ("RCPI").

Transmitting mechanism 670 transmits a response corresponding to wireless clients based on determined strength of the signal. In some embodiments, transmitting mechanism 670 transmits responses to clients on a preferred communication band. In other embodiments, transmitting mechanism 670 transmits responses to clients on a non-preferred communication band.

Guiding mechanism 680 ignores the current request. In some embodiments, guiding mechanism 680 ignores the current request responsive to the strength of the signal associated with a previous request on a preferred band being weaker than a pre-determined threshold signal strength level. In some embodiments, guiding mechanism 680 ignores the current request responsive to the strength of the signal associated with a current request on a non-preferred band being weaker than another pre-determined threshold signal strength level.

The present disclosure may be realized in hardware, software, or a combination of hardware and software. The present invention may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "access point" (AP) generally refers to receiving points for any known or convenient wireless access technology which may later become known. Specifically, the term AP is not intended to be limited to 802.11 APs. APs generally function to allow wireless devices to connect to a wired network via various communications standards.

As used herein, the term "mechanism" generally refers to a component of a system or device to serve one or more functions, including but not limited to, software components, electronic components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

What is claimed is:

1. A non-transitory computer readable medium comprising instructions which, when executed by one or more hardware processors of a network device, cause the network device to:
receive a first message on a first communication band from a wireless client device;
store a signal strength indicator value indicating a signal strength associated with the first message received on the first communication band;
receive a second message on a second communication band from the wireless client device;
in response to receiving the second message on the second communication band, determine whether the network device has previously received any message from the wireless client device on the first communication band within a predetermined time period;
in response to determining that the network device received the first message on the first communication band within the predetermined time period, determine whether the network device should continue using the first communication band or start using the second communication band to communicate with the wireless client device based on the stored signal strength indicator value of the first message received on the first communication band; and
responsive to determining that the network device should start using the second communication band to communicate with the wireless client device, transmit a response to the second message on the second communication band.

2. The non-transitory computer readable medium of claim 1, wherein the instructions further cause the network device to:
responsive to determining that the network device should continue using the first communication band, refrain from transmitting the response to the second message on the second communication band.

3. The non-transitory computer readable medium of claim 2, wherein determining that the network device should continue using the first communication band is based on determining that the signal strength, indicated by the stored signal strength indicator value, is above a threshold signal strength value for the first communication band.

4. The non-transitory computer readable medium of claim 1, wherein the instructions further cause the network device to:
responsive to determining that the network device should continue using the first communication band, transmit to the wireless client device a third message on the first communication band.

5. The non-transitory computer readable medium of claim 1, wherein determining that the network device should start using the second communication band is based on determining that the signal strength, indicated by the stored signal strength indicator value, is below a threshold signal strength value for the first communication band.

6. The non-transitory computer readable medium of claim 1, wherein each of the first message and second message comprise a respective PROBE request message.

7. The non-transitory computer readable medium of claim 1, wherein the signal strength associated with the first message is indicated by a signal-to-noise ratio associated with the signal.

8. The non-transitory computer readable medium of claim 1, wherein determining whether the network device should start using the second communication band is further based on another signal strength indicator value indicating a signal strength associated with the second message.

9. The non-transitory computer readable medium of claim 1, wherein determining whether the network device should continue using the first communication band is based on a comparison of the stored signal strength indicator value indicating the signal strength associated with the first message with another signal strength indicator value indicating a signal strength associated with the second message.

10. A network device comprising:
a hardware processor; and
a memory storing instructions that when executed by the hardware processor cause the hardware processor to:
receive a first message on a first communication band from a wireless client device;
store a signal strength indicator value indicating a signal strength associated with the first message received on the first communication band;
receive a second message on a second communication band from the wireless client device;
in response to receiving the second message on the second communication band, determine whether the network device has previously received any message from the wireless client device on the first communication band within a predetermined time period;
in response to determining that the network device received the first message on the first communication band within the predetermined time period, determine whether the network device should continue using the first communication band or start using the second communication band to communicate with the wireless client device based on the stored signal strength indicator value of the first message received on the first communication band;
responsive at least to determining that the network device should start using the second communication band, transmit a response to the second message on the second communication band.

11. The network device of claim 10, wherein the instructions further cause the network device to:
responsive to determining that the network device should continue using the first communication band, refrain from transmitting the response to the second message on the second communication band.

12. The network device of claim 11, wherein determining that the network device should continue using the first communication band is based on determining that the signal strength, indicated by the stored signal strength indicator value, is above a threshold signal strength value for the first communication band.

13. The network device of claim 10, wherein the instructions further cause the network device to:
responsive to determining that the network device should continue using the first communication band, transmit to the wireless client device a third message on the first communication band.

14. The network device of claim 10, wherein determining that the network device should start using the second communication band is based on determining that the signal strength, indicated by the stored signal strength indicator value, is below a threshold signal strength value for the first communication band.

15. The network device of claim 10, wherein each of the first message and second message comprise a respective PROBE request message.

16. The network device of claim 10, wherein the signal strength associated with the first message is indicated by a signal-to-noise ratio associated with the signal.

17. The network device of claim 10, wherein determining whether the network device should start using the second communication band is further based on another signal strength indicator value indicating a signal strength associated with the second message.

18. The network device of claim 10, wherein determining whether the network device should continue using the first communication band is based on a comparison of the stored signal strength indicator value indicating the signal strength associated with the first message with another signal strength indicator value indicating a signal strength associated with the second message.

19. A method comprising:
receiving, at a network device, a first message on a first communication band from a wireless client device;
storing a signal strength indicator value indicating a signal strength associated with the first message received on the first communication band;
receiving, at the network device, a second message on a second communication band from the wireless client device;
in response to receiving the second message on the second communication band, determining whether the network device has previously received any message from the wireless client device on the first communication band within a predetermined time period;
in response to determining that the network device received the first message on the first communication band within the predetermined time period, determining whether the network device should continue using the first communication band or start using the second communication band to communicate with the wireless client device based on the stored signal strength indicator value of the first message received on the first communication band; and
responsive to determining that the network device should start using the second communication band to communicate with the wireless client device, transmitting, by the network device, a response to the second message on the second communication band.

20. The method of claim 19, wherein determining that the network device should continue using the first communication band is based on determining that the stored signal strength indicator value of the first message is above a threshold signal strength value for the first communication band.

* * * * *